United States Patent [19]
Smith

[11] Patent Number: 5,647,199
[45] Date of Patent: Jul. 15, 1997

[54] COMBINED-CYCLE WITH MULTI-PRESSURE REHEAT SYSTEM

[75] Inventor: Raub Warfield Smith, Clifton Park, N.Y.

[73] Assignee: General Electric Co., Schenectady, N.Y.

[21] Appl. No.: 526,729

[22] Filed: Sep. 12, 1995

[51] Int. Cl.$^6$ .................................................. F02C 6/18
[52] U.S. Cl. ................................... 60/39.02; 60/39.182
[58] Field of Search ............................... 60/39.02, 39.15, 60/39.182, 653

[56] References Cited

U.S. PATENT DOCUMENTS

| | | | |
|---|---|---|---|
| 3,879,616 | 4/1975 | Baker et al. | 60/39.182 |
| 5,109,665 | 5/1992 | Hoizumi et al. | 60/39.182 |
| 5,471,832 | 12/1995 | Sugita et al. | 60/39.182 |

Primary Examiner—Louis J. Casaregola
Attorney, Agent, or Firm—Nixon & Vanderhye

[57] ABSTRACT

A combined-cycle multi-pressure reheat system employs a plurality of power generation units each having a gas turbine, a high-pressure steam turbine, a generator, a compressor and a heat recovery steam generator with a reheater. In its simplest single-shaft form, high-pressure steam is supplied to the high-pressure steam turbine and exhaust steam therefrom is supplied to a reheater of the HRSG. Intermediate-pressure steam from the intermediate section of the HRSG combines with the cold reheat steam for heating in the reheater section. The hot reheat steam is supplied from each power generation unit to the inlet of an intermediate pressure steam turbine. Low-pressure steam from a low-pressure section of the HRSG is supplied to a header where it combines with exhaust steam from the intermediate-pressure turbine to drive a low-pressure turbine. The intermediate and low-pressure turbines may be coupled to a common generator. The gas turbine may be steam cooled by routing exhaust steam from the high pressure steam turbine to the gas turbine and exhausting spent cooling steam to the intermediate pressure steam turbine.

20 Claims, 2 Drawing Sheets

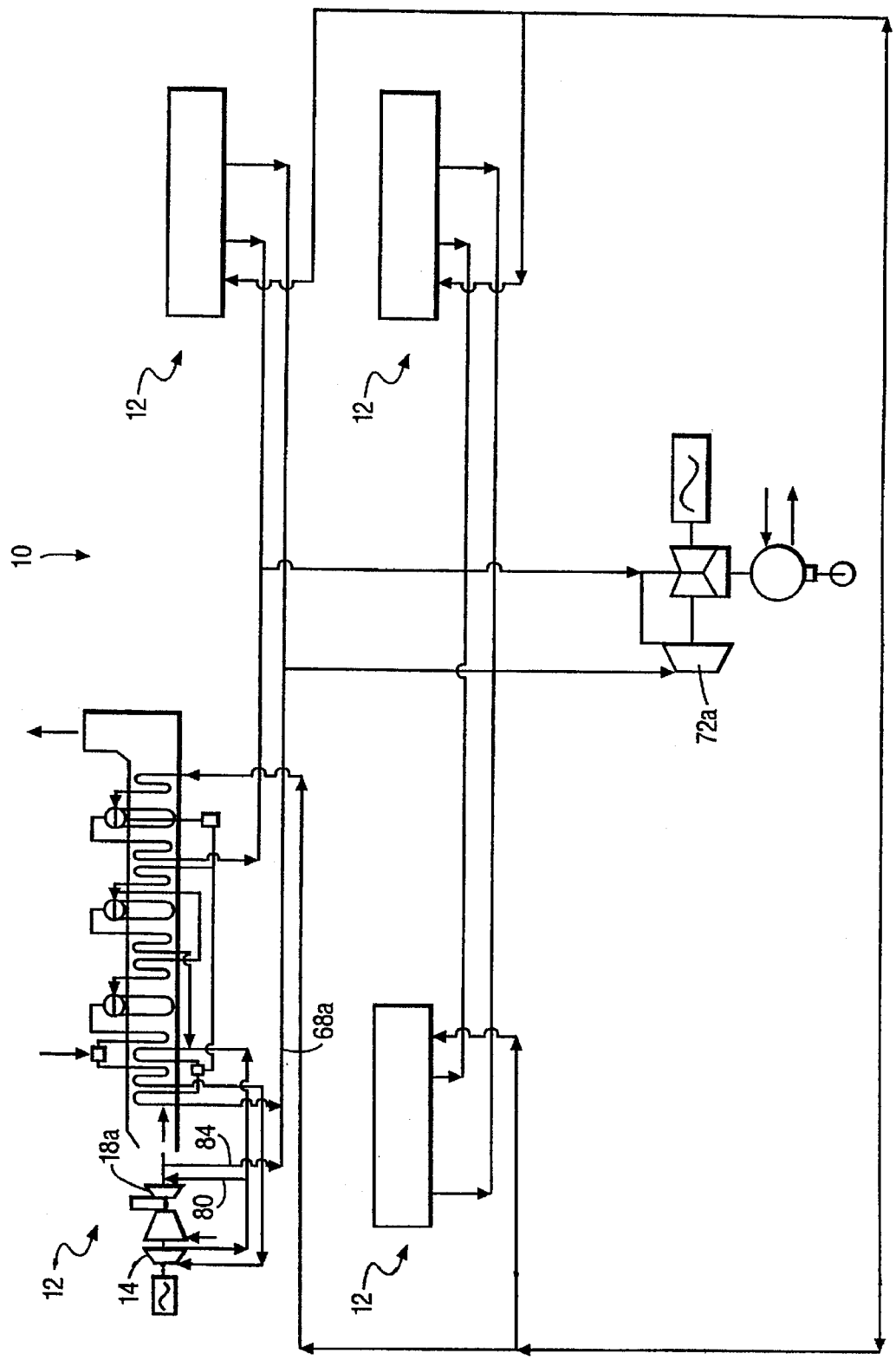

COMBINED-CYCLE WITH MULTI-PRESSURE REHEAT SYSTEM

TECHNICAL FIELD

The present invention relates to a combined cycle for the generation of power and particularly relates to a combined cycle with a multi-pressure reheat steam system.

BACKGROUND

Combined-cycle power generation systems typically include gas turbines, steam turbines, generators, heat recovery steam generators (HRSG's) and controls, all optimized and matched to form an economical power plant. Single-shaft combined-cycle systems consist of one gas turbine, one steam turbine, one generator and one heat recovery steam generator with the gas turbine and steam turbine coupled to the single generator in a tandem arrangement on a single shaft. Multi-shaft systems have one or more gas turbines/generators and HRSG's that supply steam through a common header to a separate single steam turbine-generator. Multiple-pressure reheat steam cycles are typically applied in conjunction with gas turbines that have high exhaust gas temperature as a means of increasing the energy conversion efficiency of the bottoming steam cycle.

In a reheat combined-cycle system, steam is typically supplied back from the steam turbine to the heat recovery steam generator, where it is heated and returned to the steam turbine. This is not a particular problem with a single-shaft combined-cycle system with one steam turbine and one HRSG which receives heat from the gas turbine because the reheat steam is supplied directly from the one steam turbine to a single HRSG. Application of a reheat steam cycle to a multi-shaft combined cycle has typically been restricted to a configuration in which cold reheat steam is distributed to each of only two HRSG's for reheating and subsequent return to the steam turbine. This restriction is a result of the complexity, expense and operability problems that arise when more than two HRSG's are involved. That is to say, the distribution and recollection of reheat steam becomes greatly complicated in terms of piping, valves and other ancillary equipment. The reheat steam distribution problems are most severe in the case of repowering an existing nuclear steam turbine which, because of its size, may require ten or more gas turbines and HRSG's to supply steam up to its rated capacity. Thus, a highly complex system of piping, valves and controls with corresponding high expense would be necessary in order to take the steam from the high-pressure steam turbine exhaust, and supply it to ten or twelve different HRSG's and then return the steam to the steam turbine. Consequently, the full performance potential of the combined cycle has been compromised in large, multi-shaft configurations due to the practical necessity of using a non-reheat steam cycle.

DISCLOSURE OF THE INVENTION

In accordance with the present invention, there is provided a multi-pressure reheat cycle in which a high-pressure steam turbine is added to each gas turbine generator shaft, the high-pressure steam turbine being split off from one or more lower pressure steam expansion turbines. This eliminates the complexity of pipes, valves and controls otherwise necessary to properly apportion reheat steam from one large high-pressure steam turbine to a multitude of HRSG's. It also affords the opportunity for simple cycle operation of the gas turbines with installation of a relatively small clutch between the high-pressure steam turbine shaft and the gas turbine shaft. Further, the steam cycle configuration of the present invention is also useful in conjunction with steam cooling of the gas turbine.

More particularly, the present invention includes a plurality of power generating units, each including an electrical generator, a gas turbine, a high-pressure steam turbine and a multiple-pressure heat recovery steam generator (HRSG) in heat transfer relation with the hot exhaust gases of the gas turbine. Steam from a high-pressure superheater of the HRSG is supplied to the inlet of the high-pressure steam turbine. The HRSG includes a reheat section for reheating steam exhausted from the high-pressure steam turbine and combining it with steam from an intermediate-pressure section of the HRSG for supplying hot reheat steam to a common lower-pressure turbine, e.g., an intermediate-pressure steam turbine. Steam from the low-pressure section of the HRSG is also supplied to a low-pressure steam turbine, preferably on the same shaft as the intermediate-pressure turbine. The high-pressure steam turbine, electrical generator and gas turbine are preferably disposed on a common shaft. However, for simple-cycle capability, a clutch may be interposed between the high-pressure steam turbine and the generator or gas turbine so that, upon declutching, simple-cycle operability is achieved.

The present invention affords a performance benefit of about 1–4% higher combined-cycle efficiency in comparison to a non-reheat cycle. While a single large high-pressure steam turbine is replaced with several smaller high-pressure steam turbines according to this invention, the savings in pipings, valves, controls and the like provides a lower installed cost, particularly in installations with three or more HRSG's. Further savings are achieved by reducing the steam supply system to the lower-pressure steam turbines, e.g., an intermediate-pressure and lower-pressure turbine, to a single header arrangement, enabling the gas turbine/HRSG's to be easily added or shut down to meet plant load requirements.

In a further preferred embodiment of the present invention, the gas turbine may be steam-cooled. In this embodiment, the steam exhausted from the high-pressure steam turbine may in part be supplied directly to the gas turbine for cooling purposes. The remaining part of the high-pressure steam turbine exhaust may be supplied to the reheater and mixed with steam from the intermediate-pressure section of the HRSG. The hot reheat steam then may combine with the spent cooling steam from the gas turbine for supplying steam to the intermediate-pressure steam turbine.

Accordingly, the present invention provides a combined-cycle system comprising a plurality of power generating units, each including an electrical generator, a gas turbine, a high-pressure steam turbine and a multiple-pressure heat recovery steam generator in heat transfer relation with the hot exhaust gas of the gas turbine and having a reheat section. The high-pressure steam turbine and the gas turbine are coupled together to drive the electrical generator, to supply steam from a high-pressure section of the heat recovery steam generator to the high-pressure steam turbine, and to supply steam exhausted from the high-pressure turbine to the reheat section of the HRSG for reheating steam exhausted from the high-pressure steam turbine and to provide hot reheat steam. The single intermediate-pressure steam turbine operates at a lower pressure than the high-pressure steam turbine and accepts hot reheat steam from each of the reheat sections of the power generating units and exhausts to the single lower-pressure steam turbine.

The present invention also embraces a method of operating a combined-cycle system by providing a plurality of power generating units, each including an electrical generator, a gas turbine, a high-pressure steam turbine and a multiple-pressure heat recovery steam generator having a reheat section, disposing the heat recovery steam generator in heat transfer relation with the hot exhaust gas of the gas turbine, coupling the high-pressure steam turbine and the gas turbine together to drive the electrical generator, supplying steam from a high-pressure section of the heat recovery steam generator to the high-pressure steam turbine for driving the latter, supplying steam exhausted from the high-pressure steam turbine to the reheat section for reheating steam exhausted therefrom and to provide hot reheat steam, providing a steam turbine operable at a lower pressure than the high-pressure steam turbine, and supplying hot reheat steam from each of the reheat sections of the power generating units to the common lower-pressure steam turbine.

Accordingly, it is a primary feature of the present invention to provide a novel and improved multi-pressure reheat steam cycle in a multi-shaft combined-cycle system which minimizes or eliminates the complexity of pipes, valves, controls and the like otherwise necessary to properly apportion reheat steam from a large high-pressure steam turbine to a multitude of heat recovery steam generators.

BRIEF DESCRIPTION OF THE DRAWINGS

FIG. 2 is a schematic diagram of a multi-pressure reheat steam cycle according to the present invention using steam-cooled gas turbines.

BEST MODE FOR CARRYING OUT THE INVENTION

Figure 1:
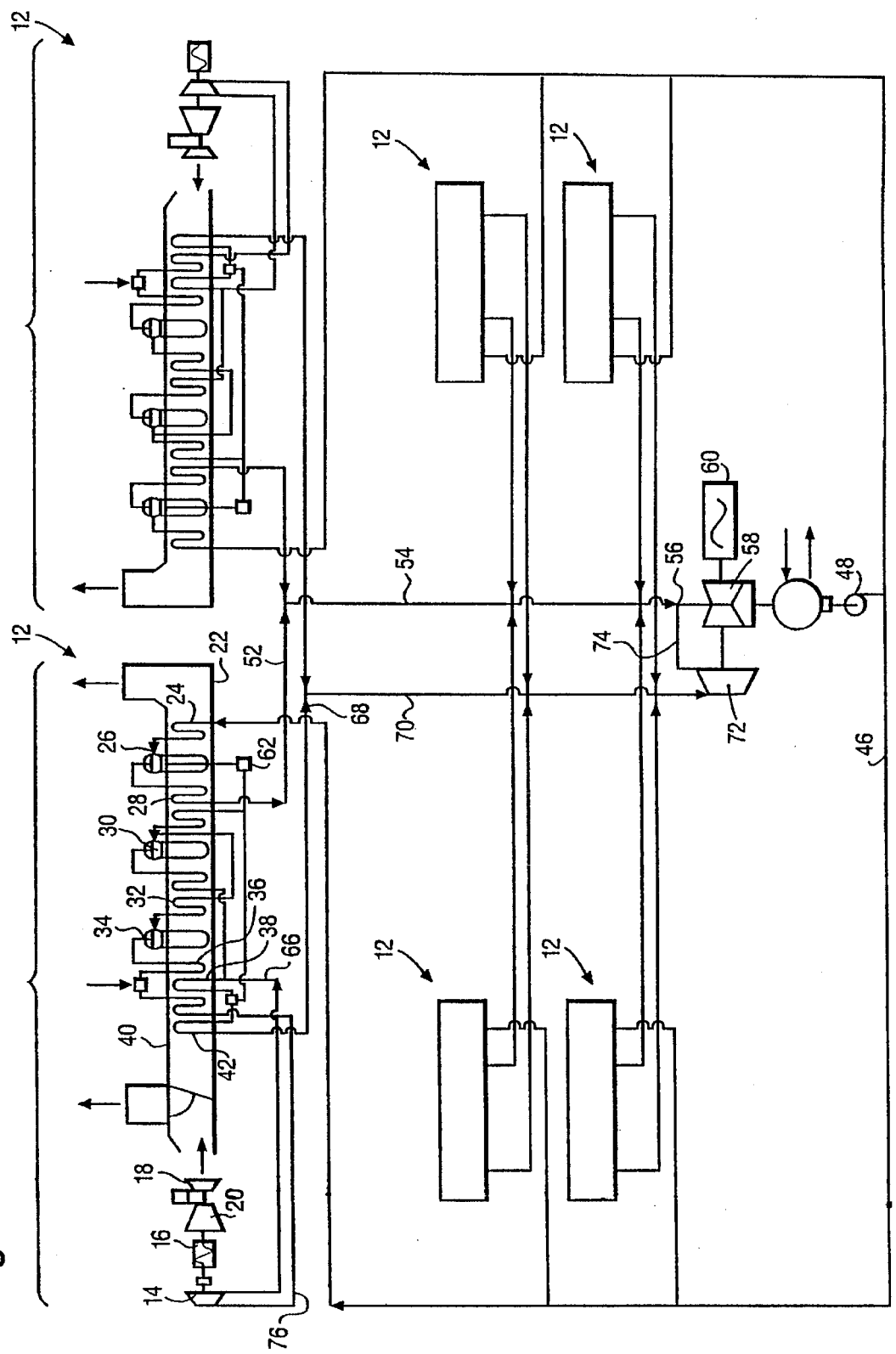
FIG. 1 is a schematic diagram of a multi-pressure reheat steam cycle according to the present invention.

In a conventional multi-pressure non-reheat combined-cycle system (not illustrated), a plurality of power generation units each having a gas turbine powering a generator and a heat recovery steam generator (HRSG) are arranged to supply high-pressure steam from the high-pressure section of the heat recovery steam generators to a single high-pressure steam turbine. The exhaust from the high-pressure steam turbine, in turn, is supplied to an intermediate-pressure steam turbine, which in turn supplies exhaust steam to a low-pressure steam turbine, all driving a generator. The steam supply to the intermediate and low-pressure steam turbines is supplied from the intermediate and low-pressure drums of the heat recovery steam generators. It will be appreciated that application of a reheat steam cycle to a power generation configuration such as this would involve complex piping and valving arrangements and controls therefor which would effectively prohibit practical and commercial application of a multi-pressure reheat steam cycle, for example, where in excess of two heat steam recovery generators would be used.

Referring to the drawing figures, particularly to FIG. 1, there is illustrated a multi-pressure reheat combined-cycle system according to the present invention, generally designated 10. System 10 includes a plurality, preferably in excess of two, of discrete power generation units, generally designated 12. Each of the power-generating units 12 includes a high-pressure steam turbine 14 coupled to a generator 16 for driving the generator. Additionally coupled to the generator is a gas turbine 18 having on a common shaft a compressor 20. As illustrated on the right-hand side of FIG. 1, one or more of the units 12 may provide the high-pressure steam turbine 14, generator 16, compressor 20 and gas turbine 18 on a common shaft 19. As illustrated in the left side of FIG. 1, one or more of the units 12 may provide a clutch 21 for coupling the high-pressure steam turbine 14 to the generator or the gas turbine whereby, upon declutching the steam turbine from the generator, the power generation unit 12 can be operated in a simple cycle (gas turbine drive only) mode. It will be appreciated that these units 12 may be all of one or the other types or a mix thereof as illustrated. Further, the schematic illustrations of the units 12 below the first tier detailed showing of the units each represents a replication of the first tier unit. It will also be appreciated that the number of units 12 may be greater or lesser than the number of units illustrated.

Each power generation unit 12 includes a heat recovery steam generator (HRSG) 22 supplied with the exhaust gases from the gas turbine 18. It will be appreciated that the hot gases of combustion exhausting from the turbine 18 are therefore placed in heat transfer relation with various evaporators and heaters within the HRSG 22 for purposes of affording hot reheat steam as well as steam for driving a lower-pressure turbine than the high-pressure turbine 14. Particularly, each HRSG 22 comprises a low-pressure economizer 24, a low-pressure evaporator 26, a low-pressure superheater 28 (optional), an intermediate evaporator 30, a high-pressure economizer 32, a high-pressure evaporator 34, one or more high-pressure superheater sections 36 and 40, a reheater 38, and an intermediate superheater 42 (optional). It will be appreciated that condensate is fed to each of the HRSG's 22 by a feed line 46 coupled to a condensate pump 48, with each feed line 49 for the individual power generation units 12 being connected in parallel with the main condensate feed 46.

Condensate passes through the low-pressure economizer 24 and into the low-pressure evaporator 26. Steam from the low-pressure evaporator 26 is directed through the optional low pressure superheater 28 and via line 52 and a line 54 into a manifold 56 for supplying steam to a low-pressure steam turbine 58. Steam turbine 58 is also coupled to a generator 60. Condensate and feed water are also supplied to the intermediate pressure evaporator 30 from a feed water pump 62. Steam generated by the intermediate pressure evaporator 30 passes through an optional superheater 42 and joins with a cold steam reheat line 66. The combined cold reheat steam and steam from the intermediate pressure evaporator 30 passes through the reheater section 38 for flowing hot reheat steam through line 68 and line 70 to the inlet of an intermediate-pressure steam turbine 72. The intermediate pressure steam turbine 72 and the low-pressure steam turbine 58 are preferably on a common shaft with the generator 60, although separate shafts with separate generators may be provided. Additionally, the exhaust from the intermediate steam turbine 72 passes through line 74 to the header 56 where it combines with the low-pressure steam from evaporator 26 for supplying low-pressure steam to the low-pressure turbine 58. High-pressure steam is supplied to the high-pressure turbine 14 from the high pressure evaporator 34 via line 76.

In operation, it will be appreciated that each gas turbine 18 provides hot exhaust gases of combustion to its associated HRSG 22 for heating the feed water and steam in the various heat exchangers of the HRSG for each power generation unit 12. Thus, supply steam is provided to the high-pressure steam turbine 14 from the high pressure superheater 40 and exhaust steam or cold reheat from turbine 14 is supplied via lines 65 and 66 to the reheater 38 of the HRSG 22. The steam from the intermediate-pressure drum joins with the cold reheat steam in line 66 for reheating in the reheater 38. The hot reheat steam from the reheater 38 is supplied via lines 68 and 70 to the intermediate-pressure steam turbine 72. The exhaust from the intermediate pressure steam turbine 72 is supplied via line 74 to the manifold 56, where it combines with low-pressure steam delivered from the low-pressure drum 26 via lines 52 and 54. The manifold 56 delivers the combined low pressure steam to the low-pressure turbine 58 for driving the generator 60. Consequently, it will be seen with the foregoing arrangement that each high-pressure steam turbine 14 supplies steam for reheat to a single HRSG and that the hot reheat steam from the reheater of each of the HRSG's 22 of each power-generating unit 12 combine to supply steam to the intermediate-pressure steam turbine 72. Thus, a multiple-pressure reheat combined-cycle is provided which eliminates various complexities of piping, valving and controls which would otherwise be necessary to properly apportion reheat steam from one large high-pressure steam turbine to a multitude of HRSG's. From a review of FIG. 1, it will also be appreciated that by use of the clutch 21 interposed between the high-pressure steam turbine 14 and the generator 16, the high-pressure steam turbine 14 can be declutched from the system to provide for simple cycle (gas turbine drive only) operability.

It has also been found that the present invention is applicable to a multi-pressure reheat system wherein steam-cooled gas turbines are provided. Referring now to FIG. 2, wherein like reference numerals, followed by the suffix "a", are used to designate like parts, the system is essentially as previously described. Here, however, the exhaust from the high-pressure steam turbine 14a is split for delivery to the reheater of the HRSG via line 65a as previously described and to the steam cooling passage inlet of the gas turbine via line 80. The spent cooling steam from the gas turbine 18a is supplied to the hot reheat supply line 68a for the intermediate-pressure steam turbine 72a via line 84. The remaining portions of the HRSG as well as the various steam and turbines are identical as previously described. Thus, similar advantages accrue as in the previous embodiment with the additional advantage of being also able to steam-cool the rotating and stationary parts of the gas turbine.

With the foregoing arrangement, it will also be appreciated that a combined-cycle steam-cooled gas turbine can be installed with just a high-pressure steam turbine and a partially tubed HRSG which would facilitate phased combined-cycle construction. Thus, the intermediate and low-pressure sections of the steam-generating surfaces of the HRSG can be initially omitted or deferred until a later time as dictated by utility economics.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, cycle efficiency is maximized with the preferred embodiment wherein hot reheat steam from a plurality of power generation units is supplied to a common lower-pressure steam turbine generator. Customer specific site limitations might favor an alternate embodiment wherein an intermediate pressure steam turbine is included with the high pressure steam turbine, gas turbine, and generator on a single shaft, with or without an optional clutch between the high pressure and intermediate pressure steam turbines and generator. This arrangement could be advantageous in the situation where the low pressure steam turbine is physically distant from the plurality of power generation units because a long run of high temperature alloy piping could be replaced with less expensive low temperature piping.

What is claimed is:

1. A combined-cycle system comprising:
   a plurality of power generating units each including an electrical generator, a gas turbine, a high-pressure steam turbine and a multiple-pressure heat recovery steam generator in heat transfer relation with the hot exhaust gas of said gas turbine and having a reheat section, said high-pressure steam turbine and said gas turbine being coupled together to drive said electrical generator, means for supplying steam from a high-pressure section of said heat recovery steam generator to said high-pressure steam turbine, and means for supplying steam exhausted from said high-pressure turbine to said reheat section for reheating steam exhausted from said high-pressure steam turbine and to provide hot reheat steam;
   a steam turbine operable at a lower pressure than said high-pressure steam turbine; and
   means for supplying hot reheat steam from each of said reheat sections of said power generating units to said lower-pressure steam turbine.

2. A system according to claim 1 wherein said high-pressure steam turbine and said gas turbine of each power generating unit are on a single common shaft and said lower-pressure steam turbine is on another shaft.

3. A system according to claim 1 including a clutch for coupling said high-pressure steam turbine and said generator of each power generating unit whereby the combined-cycle system is operable in a simple cycle, gas turbine drive only, mode upon declutching said high-pressure steam turbine and said generator from one another.

4. A system according to claim 1 wherein said plurality of power generating units is in excess of two units.

5. A system according to claim 1 including means for supplying at least a portion of the steam exhausted from said high-pressure steam turbine to said gas turbine for cooling said gas turbine.

6. A system according to claim 5 including means for combining spent cooling steam from said gas turbine and said reheat section whereby combined spent cooling steam and hot reheat steam is supplied to said lower-pressure steam turbine.

7. A system according to claim 1 wherein said lower-pressure steam turbine comprises an intermediate-pressure steam turbine, a low-pressure steam turbine, and means for supplying steam exhausted from said intermediate-pressure steam turbine to said low-pressure steam turbine.

8. A system according to claim 7 wherein each said heat recovery steam generator has a low-pressure section, means for combining low-pressure steam from said low-pressure section of each heat recovery steam generator with the steam exhausted from said intermediate-pressure steam turbine for delivery to said low-pressure steam turbine.

9. A system according to claim 1 including an electrical generator coupled to and driven by said lower-pressure steam turbine.

10. A system according to claim 1 wherein said plurality of power generating units is in excess of two units, said lower-pressure steam turbine comprising an intermediate-pressure steam turbine, a low-pressure steam turbine, and means for supplying steam exhausted from said intermediate-pressure steam turbine to said low-pressure steam turbine, including an electrical generator coupled to and driven by said lower-pressure steam turbine.

11. A system according to claim 5 including means for combining spent cooling steam from said gas turbine and said reheat section whereby combined spent cooling steam and hot reheat steam is supplied said lower-pressure steam turbine, said lower-pressure steam turbine comprising an intermediate-pressure steam turbine, a low-pressure steam turbine, and means for supplying steam exhausted from said intermediate-pressure steam turbine to said low-pressure steam turbine.

12. A system according to claim 11 wherein each said heat recovery steam generator has a low-pressure section, means for combining low-pressure steam from said low-pressure section of each heat recovery steam generator with the steam exhausted from said intermediate-pressure steam turbine for delivery to said low-pressure steam turbine.

13. A system according to claim 12 wherein said high-pressure steam turbine and said gas turbine of each power generating unit are on a single common shaft and said lower-pressure steam turbine is on another shaft.

14. A system according to claim 12 including a clutch for coupling said high-pressure steam turbine and said generator of each power generating unit whereby the combined-cycle system is operable in a simple cycle, gas turbine drive only, mode upon declutching said high-pressure steam turbine and said generator from one another.

15. A method of operating a combined-cycle system comprising the steps of:

providing a plurality of power generating units each including an electrical generator, a gas turbine, a high-pressure steam turbine and a multiple-pressure heat recovery steam generator having a reheat section;

disposing said heat recovery steam generator in heat transfer relation with the hot exhaust gas of said gas turbine;

coupling said high-pressure steam turbine and said gas turbine together to drive said electrical generator;

supplying steam from a high-pressure section of said heat recovery steam generator to said high-pressure steam turbine for driving the latter;

supplying steam exhausted from said high-pressure steam turbine to said reheat section for reheating steam exhausted therefrom and to provide hot reheat steam;

providing a steam turbine operable at a lower pressure than said high-pressure steam turbine; and supplying hot reheat steam from each of said reheat sections of said power generating units to said lower-pressure steam turbine.

16. A method according to claim 15 including providing said high-pressure steam turbine and said gas turbine of each power generating unit on a single common shaft and said lower-pressure steam turbine on another shaft.

17. A method according to claim 15 including providing a clutch for coupling said high-pressure steam turbine and said generator of each power generating unit and operating the combined-cycle system in a simple cycle mode by declutching said high-pressure steam turbine and said generator from one another.

18. A method according to claim 15 including providing in excess of two of said plurality of power generating units.

19. A method according to claim 15 including supplying at least a portion of the steam exhausted from said high-pressure steam turbine to said gas turbine for cooling said gas turbine.

20. A system according to claim 19 including combining spent cooling steam from said gas turbine and said reheat steam supply section whereby combined spent cooling steam and hot reheat steam is supplied to said lower-pressure steam turbine.

* * * * *